United States Patent [19]

Giometti

[11] Patent Number: 4,768,392
[45] Date of Patent: Sep. 6, 1988

[54] ENGINE STARTER DEVICE

[75] Inventor: Paul F. Giometti, Horseheads, N.Y.

[73] Assignee: Facet Enterprises, Inc., Tulsa, Okla.

[21] Appl. No.: 61,424

[22] Filed: Jun. 12, 1987

[51] Int. Cl.⁴ .................. F02N 15/06; F16D 43/06
[52] U.S. Cl. ............................... 74/6; 72/402;
74/7 R; 74/7 A; 192/103 A; 192/104 R
[58] Field of Search ............ 74/6, 7 R, 7 A; 72/370,
72/402; 192/103 A, 104 R

[56] References Cited

U.S. PATENT DOCUMENTS

| 2,947,081 | 8/1960 | Clevenger | 72/370 X |
| 3,263,474 | 8/1966 | Pentland | 72/402 X |
| 3,263,509 | 8/1966 | Digby | 192/104 R X |
| 3,306,409 | 2/1967 | Giometti | 192/104 R |
| 3,407,638 | 10/1968 | Greis et al. | 72/370 X |
| 3,915,020 | 10/1975 | Johnson | 192/104 R X |
| 4,114,746 | 9/1978 | Usui et al. | 192/104 R |
| 4,154,082 | 5/1979 | Beech | 72/370 |
| 4,322,985 | 4/1982 | Mortensen | 74/6 |
| 4,346,615 | 8/1982 | Yoneda et al. | 74/7 A |
| 4,611,499 | 9/1986 | Giometti | 74/6 |
| 4,715,239 | 12/1987 | Giometti | 74/6 |

Primary Examiner—Allan D. Herrmann
Attorney, Agent, or Firm—Remy J. VanOphem

[57] ABSTRACT

A centrifugally disengageable engine starter gear of the positive shift type that has a clutch to provide for driving and indexing of the starter gear, an internal mechanism keeps the clutch teeth in engagement during the indexing function, and a centrifugal separator separates the clutch teeth in an overrunning condition. The separator includes radially movable centrifugal flyweight members circumferentially spaced in a circular recess that contains individually formed flyweight guides that cooperate therewith to prevent excessive circumferential displacement of the flyweights during their radial movement. The method of forming flyweight guides from the clutch housing is also disclosed.

20 Claims, 3 Drawing Sheets

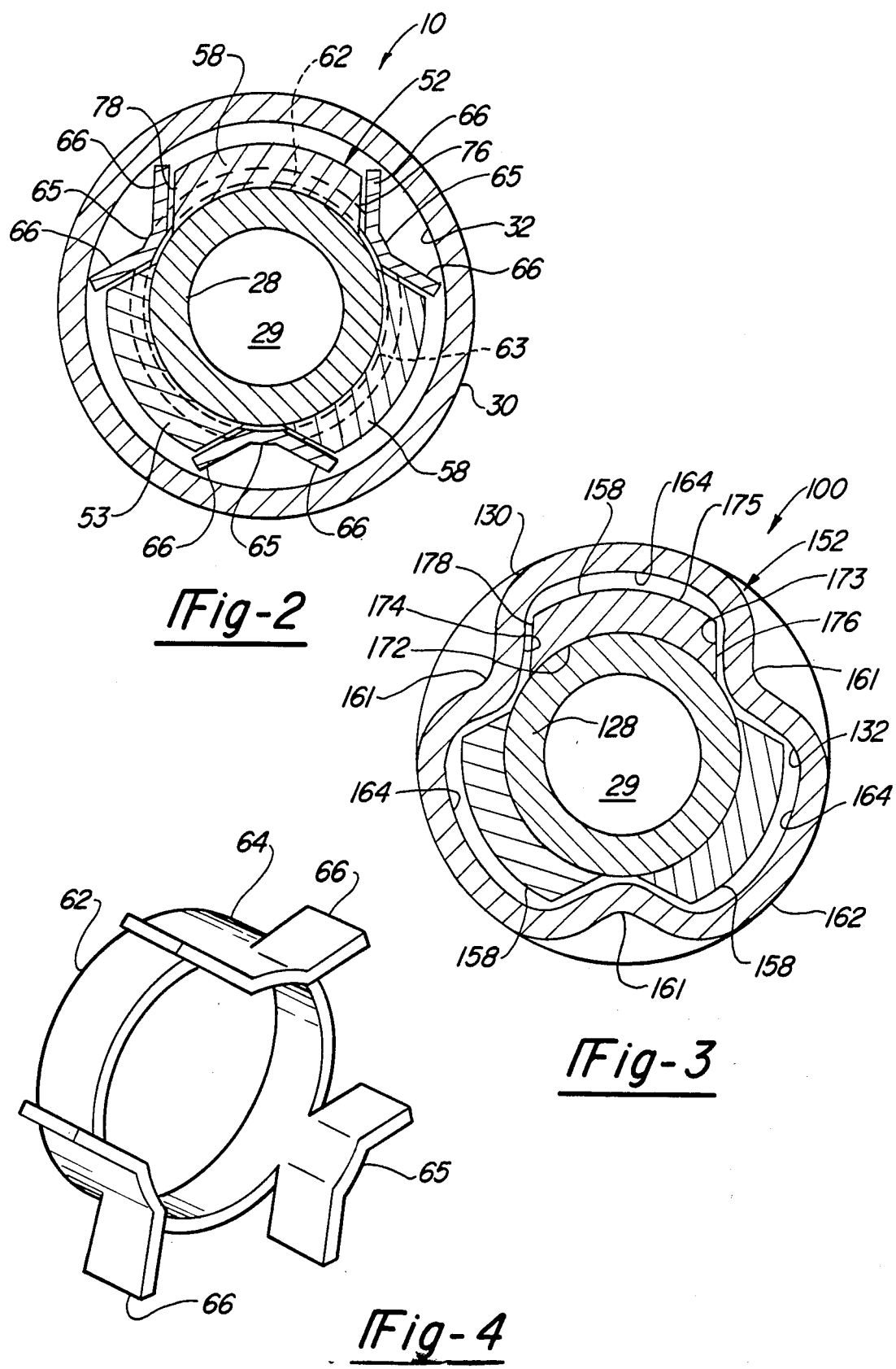

ENGINE STARTER DEVICE

BACKGROUND OF THE INVENTION

1. Field of the Invention

The present invention relates to the gearing associated with an engine starter and more particularly it relates to starter gearing of the positive shift type that includes clutch teeth to provide driving as well as over-running features. The clutch teeth are separated under the influence of radially movable flyweight members, the movement of which is circumferentially restricted by guide members.

2. Description of the Prior Art

The present invention is an improvement over the starter gearing system shown and described in U.S. Pat. No. 4,611,499 entitled "Engine Starter Gearing" and issued Sept. 16, 1986. The above referenced patent disclosed engine starter gearing that utilized centrifugal weights and a conical thrust washer for separating the dentil clutch teeth after engine start-up, thus, preventing long periods of clutch overrunning and accompanying undesirable wear on the clutch teeth. An annular recess is formed in the driven clutch member. An annular recess is also provided in the face of the driving clutch member facing the driven clutch member. An annular thrust washer is fitted in the annular recesses of the driven and driving clutch members and abuts the driving clutch member. A conical surface is provided on the annular thrust washer facing the driven clutch member. A plurality of arcuately spaced centrifugal weight members are provided in the annular recess of the driven clutch member. The centrifugal weight members are provided with an inclined surface that cooperates with the conical surface of the annular thrust washer. When an overrunning condition occurs, the centrifugal weight members move radially outward and the inclined surfaces of the weight members engage the conical surface of the annular thrust washer so as to urge the driving clutch member away from the driven clutch member to disengage the clutch teeth. The centrifugal weight members are prevented from axial or rotational movement relative to the driven clutch member by an integrally formed radially aligned pin associated with each of the movable weight members. In another embodiment of the invention, the pin is dispensed with and the weight members are restricted in axial and circumferential movement relative to the driven clutch member by guide surfaces that are an integral part of the clutch members.

While the engine starter device described above has been satisfactory in operation, it required centrifugal weight members that were expensive to manufacture in the embodiment equipped with integral pins. In the pinless embodiment, the centrifugal weight member guides required internal machining which is always expensive and fraught with tolerance problems.

Thus, it becomes highly desirable to build an improved engine starting device that retains the ease of rapid assembly plus proven economies in manufacture of the individual components thereof.

SUMMARY OF THE PRESENT INVENTION

The present invention provides a novel and improved engine starter device. The engine starter gearing of the present invention provides a centrifugal weight clutch separator that utilizes solid unitary centrifugal flyweight members that are easy to manufacture and assemble within the overall engine starter device.

In particular, the engine starter device of the present invention provides a power transmitting shaft, a sleeve slidably attached to the power transmitting shaft, and external helical splines on one extremity of the sleeve. A pinion gear is slidably journalled to the power transmitting shaft for axial movement relative thereto. The pinion gear is adapted for movement into and out of engagement with the ring gear of the engine to be started. A driven clutch member is secured to the pinion gear for movement therewith. An annular recess is formed in the driven clutch member. A driving clutch member having internal helical splines is slidably mounted on the external helical splines of the sleeve. The driving and the driven clutch members have complementary mutually engageable inclined teeth for transmitting torque therebetween in one direction of relative rotation.

A barrel housing is slidably supported on the sleeve and is provided with an open end so that the barrel housing may be fitted over the driving and driven clutch members. The driving and driven clutch members are contained within the barrel housing by a spaced lock washer or lock ring. A resilient spring member is disposed within the barrel housing and abuts the driving clutch member so as to bias the dentil clutch teeth of the driving and driven clutch members into mutual engagement. A radially outwardly extending shoulder is formed on the driving clutch member adjacent the circular recess formed in the driven clutch member. An annular thrust ring having an inner conical surface is loosely disposed in the circular recess. The annular thrust ring is adapted to abut the radially outwardly extending shoulder of the driving clutch member when displaced in an axial direction.

A plurality of centrifugal flyweight members are arranged circumferentially in the circular recess. The flyweight members each have an inclined surface that is positioned in abutting relationship with the conical surface of the thrust ring. The plurality of centrifugal flyweight members are operative to displace the annular thrust ring in an axial direction in response to centrifugal force. In both embodiments of the present invention, the flyweight members are free to move in the radial direction during operation of the engine starter, however, the axial as well as the circumferential travel of the flyweight members is partially restricted.

In one example of the structure of the present invention, an annular recess in the driven clutch member contains a flyweight guide that is easily insertable along with the flyweights at the time of assembly of the engine starter. The flyweight guide is in the form of a cylindrical body portion with axially extending finger support members formed as an integral part thereto. The finger support members each contain a plurality of finger elements that have a greater radial extent than the cylindrical body portion of the flyweight guide.

In a second embodiment of the structure of the present invention, the clutch housing is crimped so as to form individual guide pockets for the flyweights. The crimped housing limits the circumferential movement of the flyweights without hampering the radial movement thereof.

A primary object of the present invention is to provide an engine starter device that is easy to assemble, contains a minimum number of parts, and is easy to manufacture. The present invention accomplishes this object by providing a plurality of centrifugal flyweight members of simple configuration, each being limited in circumferential movement by an adjacent portion of the structure contained within the annular recess of the driven clutch member.

Another object of the present invention is to provide an engine starter device wherein the individual flyweights are circumferentially restrained by a common assembly unit.

The above and additional objects, features, and advantages of the present invention will become apparent to those skilled in the art when the following detailed description of the preferred embodiment is read together with the drawings appended hereto.

BRIEF DESCRIPTION OF THE DRAWINGS

In the drawings:

FIG. 2 is a cross-sectional view taken along lines 2-2 of FIG. 1;

FIG. 3 depicts a cross-sectional view similar to FIG. 2 of another embodiment of the present invention;

FIG. 4 is a perspective view that shows the flyweight guide of the present invention.

DETAILED DESCRIPTION OF THE PREFERRED EMBODIMENT

Figure 1:
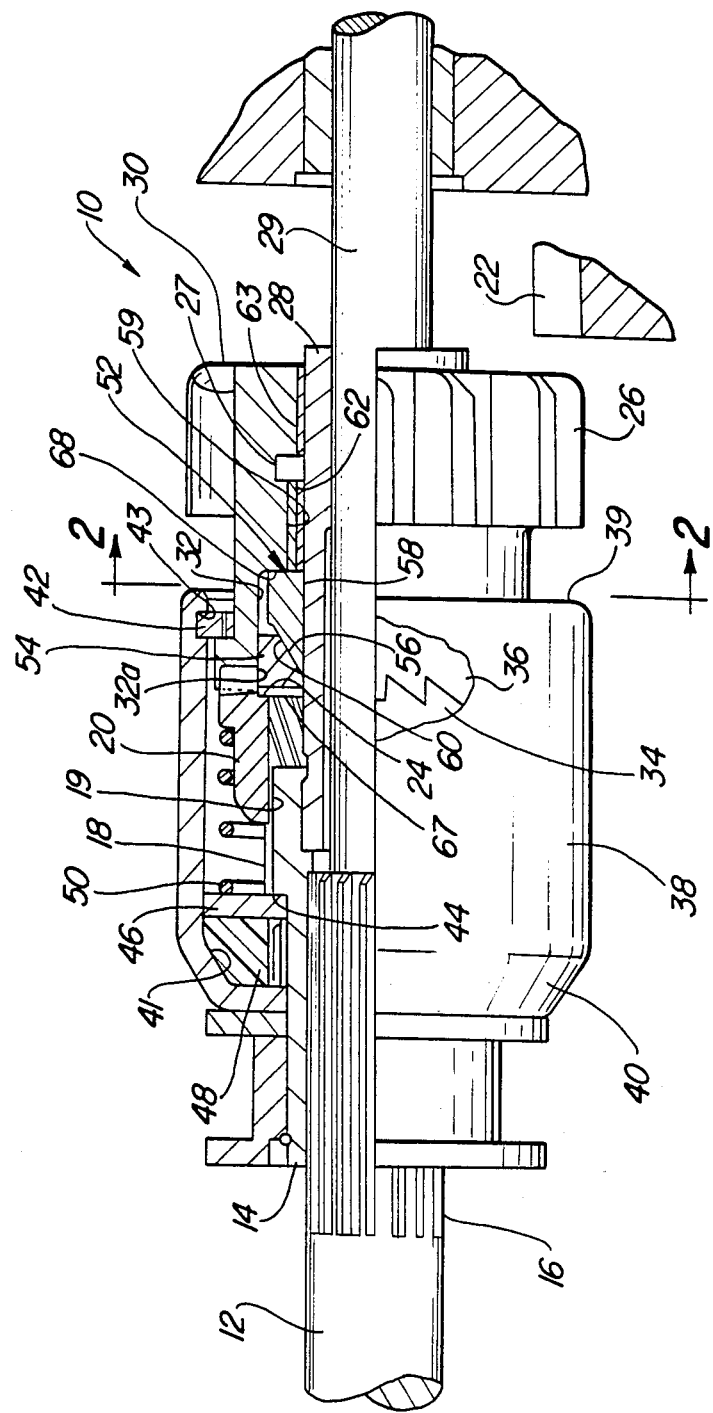
FIG. 1 is a side elevational view, partly broken away and partly in section, of an example of structure for an engine starting device according to the present invention.
Figure 5:
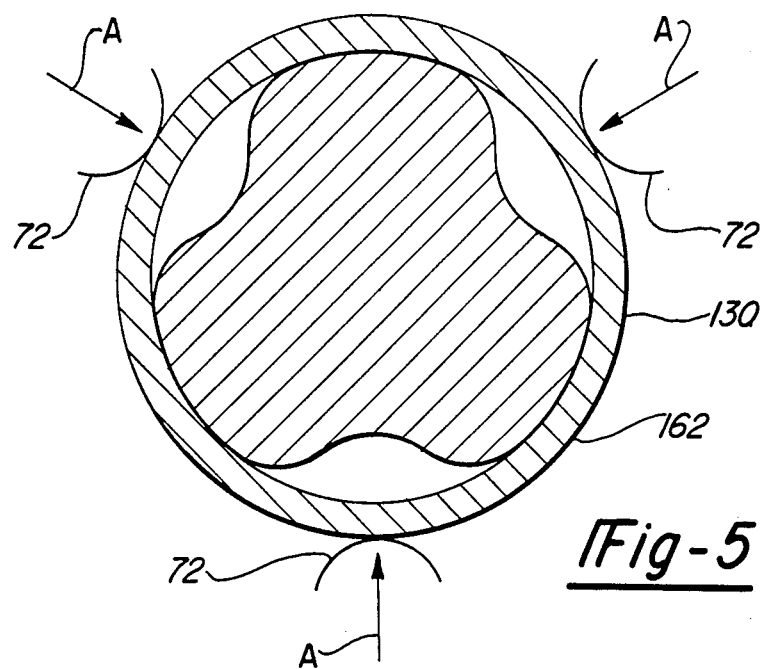
FIGS. 5 and 6 are cross-sectional views similar to FIG. 3, showing the engine starter device before and after formation of identations according to the present invention.
Figure 6:
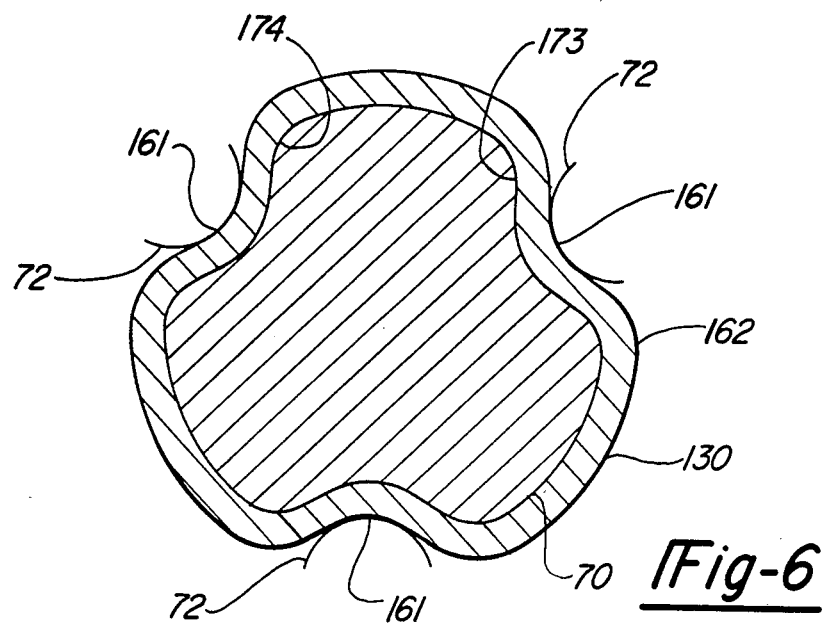

Referring now to the drawings and more particularly to FIG. 1, there is illustrated a starter drive assembly 10 for an engine, not shown, mounted to a power shaft 12 of a starting motor, also not shown. The starter drive assembly 10 includes an axially extending sleeve 14 connected to the power shaft 12 by straight splines 16. The axially extending sleeve 14 is, therefore, axially movable relative to the power shaft 12 but is not rotatable relative thereto. The external surface of the right-hand extremity of the axially extending sleeve 14, as shown, has external helical splines 18 formed thereon. A driving clutch member 20 has internal helical splines 19 that coact with the external helical splines 18 of the axially extending sleeve 14. The driving clutch member 20 is, therefore, adapted for movement towards and away from a starting gear 22 of the engine to be started. The driving clutch member 20 is shown in its engaged position in the drawing. In the engaged position, the driving clutch member 20 projects past the right end of the axially extending sleeve 14. The rightmost edge, as illustrated, of the internal helical splines 19 of the driving clutch member 20 forms a radially outwardly extending shoulder 24, for a purpose to be described later.

A sleeve 28 is slidably supported on a reduced diameter portion 29 of the power shaft 12. One end of the sleeve 28 is secured to the axially extending sleeve 14. A pinion gear 26 is journalled in a bearing 63 and retained thereon by a retainer 27. The bearing 63, in turn, is slidably mounted on the sleeve 28 thereby permitting the pinion gear 26 to be axially and rotatably movable relative to the power shaft 12. The pinion gear 26 is adapted for movement into and out of engagement with the starting gear 22 of the engine to be started. A driven clutch member 30 is integrally formed with the pinion gear 26 and extends therefrom towards the driving clutch member 20. An annular recess 32 is provided in the driven clutch member 30 adjacent to an annular recess 32a in the driving clutch member 20. The annular recess 32 cooperates with the sleeve 28 to define an annular channel therebetween.

The adjacent faces of the driving clutch member 20 and the driven clutch member 30 are provided with dentil teeth 34 and 36, respectively, which are complementary mutually engageable inclined torque transmitting dentil teeth. The dentil teeth 34 and 36 are of the sawtooth variety to provide a one-way overrunning clutch connection.

A housing 38 having an open end 39 and a closed end 40 is slidably supported at its closed end on an external surface of the axially extending sleeve 14. The housing 38 is barrel shaped in configuration and is fitted over the driving clutch member 20 and partially over the driven clutch member 30. A lock ring 42 is seated in a groove 43 adjacent the open end 39 of the housing 38. The lock ring 42 has sufficient radial length to engage the driven clutch member 30 to thereby confine the driven clutch member 30 and the driving clutch member 20 within a cavity 41 of the housing 38.

The axially extending sleeve 14 is provided with a radial shoulder 44 in an intermediate location to provide an abutment for a disk or washer 46 slidably journalled on the axially extending sleeve. A resiliently yieldable cylinder 48, preferably formed of an elastically deformable material, such as rubber, is compressively confined between the disk 46 and the closed end 40 of the housing 38. A resilient spring member 50 is compressively confined within the cavity 41 of the housing 38 between the washer 46 and the driving clutch member 20 to provide a biasing force to urge the driving clutch member 20 into engagement with the driven clutch member 30.

An advancement apparatus, not shown in the drawings but well known in the art, is provided for moving the starter drive assembly 10 towards and away from the starting gear 22 of the engine.

A centrifugal weight clutch separator 52 of the starter drive assembly 10 is illustrated in FIG. 1 of the drawing. The centrifugal weight clutch separator 52 includes an annular thrust washer 54 disposed within the annular recess 32 of the driven clutch member 30 and facing the annular recess 32a of the driving clutch member 20. A loose thrust washer 67 is interposed the annular thrust washer 54 and the radially outwardly extending shoulder 24 of the driving clutch member 20. The annular thrust washer 54 has a conical inner surface 56 facing generally towards the driven clutch member 30.

A plurality of centrifugal flyweight members 58 are annularly arranged adjacent the annular thrust washer 54 in the annular recess 32. Each of the centrifugal flyweight members 58 has an inclined surface 60 complementary with and abutting portions of the conical inner surface 56 of the annular thrust washer 54.

In order to partially restrain the flyweight members 58 in the circumferential direction, a flyweight guide 62 is provided for interaction with each of the plurality of flyweight members 58. The flyweight guide 62 is installed in a cylindrical bore 59 in the driven clutch member 30.

FIG. 4 shows more clearly the flyweight guide 62 and its interconnected portions. The flyweight guide 62 is also shown in FIG. 2 as a broken annularly extending line located radially outward from the sleeve bearing 63 which is also depicted with a broken line. The flyweight guide 62 consists of a cylindrical body section 64 that has integrally attached thereto a plurality of axially aligned finger supports 65. The finger supports 65 each have a plurality of finger elements 66 that are cantilevered such that the radial extent of the finger elements 66 is considerably greater than the radial extent of the cylindrical body section 64.

As can be seen in FIG. 2, the finger elements 66 are aligned adjacent to the sides of guide surfaces 76 and 78 of the flyweight members 58.

FIG. 3 illustrates an alternate embodiment of an engine starter device that utilizes a centrifugal weight clutch separator 152 according to the present invention. The centrifugal weight clutch separator 152 and its accompanying flyweight members 158 are identical to the centrifugal weight clutch separator 52 as shown in FIGS. 1 and 2 except as set forth below.

A starter drive assembly 100 includes a driven clutch member 130 that has a recess 132 formed therein. A plurality of partial circular recesses 164 are formed in a wall 162 of the driven clutch member 130 adjacent to the recess occupied by the flyweight members 158. The partial circular recesses 164 are defined by indentations 161 that are formed in the wall 162 adjacent to the recess 132 of the driven clutch member 130. The indentations 161 define internal surfaces 173 and 174 that are adjacent to guide surfaces 176 and 178 of the flyweight members 158.

The centrifugal flyweight members 158 are each appropriately configured for cooperation with the partial circular recesses 164 and the internal guide surfaces 173 and 174 of the indentations 161. Thus, each of the centrifugal flyweight members 158 has an inner surface 172 engaging the outer surface of a sleeve 128 and an outer surface 175 that is in spaced relationship with respect to the inside surface of the partial circular recess 164 remote therefrom. The inner surface 172 and the outer surface 175 are cylindrically shaped and concentric; concentric contours are also acceptable. The guide surfaces 176 and 178 are essentially flat.

Each of the centrifugal flyweight members 158 is also provided with a conical surface, not shown, but similar to the conical inner surface 56 as depicted in FIG. 1. The inclined surface cooperates with the conical inner surface of an annular thrust washer, similar to the annular thrust washer 54, thus, facilitating the separation of the dentil teeth on the driving and driven clutch members.

The embodiment of the starter drive assembly 100 shown in FIGS. 3 through 6 has certain advantages in that a minimum number of parts are utilized. The method contemplated for the simplest manufacture of the recesses 132 in the shell portion of the driven clutch member 130 is set forth below. The driven clutch member 130 is formed by well known fabrication techniques, such as cold forming. The overall configuration of the partially completed driven clutch member 130 is similar to the driven clutch member 30 depicted in FIG. 1. A back-up die 70 of proper configuration is inserted into the annular recess of the driven clutch member 130. External pressure is then applied by an indentation producing tool 72 radially inward along arrows A in FIG. 5 at those locations defined as indentations 161. The wall 162 conforms internally to the exterior of the internally positioned die thus, defining the guide surfaces 173 and 174.

OPERATION OF THE INVENTION

During the operation of either of the above described embodiments, the engine starting sequence is as follows: The starter drive assembly 10 is shifted to the right via the shifting mechanism, not shown, so that the pinion gear 26 engages the starting gear 22. The power shaft 12 is rotated by a starting motor, not illustrated, and transmits torque through the straight splines 16 to the axially extending sleeve 14, and from the helical splines 18 and 19 to the driving clutch member 20. The driving clutch member 20 drives the driven clutch member 30 through the dentil teeth 34 and 36. The driven clutch member 30 thereby rotates the pinion gear 26 and the starting gear 22 of the engine to be started.

As the engine fires and becomes self-operating, the starting gear 22 will drive the pinion gear 26 at a speed greater than that of the power shaft 12. The dentil teeth 34 and 36 will slip so that the starting motor is not driven at a high engine speed. In order to protect the dentil teeth 34 and 36 from severe wear because of the rubbing and clashing which would otherwise occur, and further to avoid unnecessary noise, the rapid rotation of the driven clutch member 30 drives the centrifugal flyweight members 58 radially outwardly. The movement of each centrifugal flyweight member 58 is guided by the finger elements 66 in the case of the first embodiment shown in FIG. 1 and by the guide surfaces 176 and 178 in the second embodiment shown in FIG. 3.

The centrifugal force generated by the outward movement of the centrifugal flyweight members 58, along an axial abutment stop 68 through mutual inclined surfaces, urges the annular thrust washer 54 axially to the left against the biasing force of the resilient spring member 50. The motion of the annular thrust washer 54 transferred through the loose thrust washer 67 and the radially outwardly extending shoulder 24 of the driving clutch member 20, causes a separation of the dentil teeth 34 and 36.

It will be appreciated by those skilled in the art that the engine starter drive assembly 10 heretofore described will be easier to manufacture and particularly easier to assemble than the prior art devices. Additionally, both embodiments described above permit the flyweight members 58 to have a compact volume, thus, permitting a wider array of possible available materials for the manufacture thereof.

Still other advantages of the starter drive assembly 10 and of the present invention will be apparent to those skilled in the art.

The above constitutes a detailed description of the best mode contemplated for carrying out the present invention. It will be apparent to those skilled in the art that variations and modifications may be made from the above described embodiments without departing from the spirit of the present invention. Such variations and modifications are included within the intended scope of the claims appended hereto.

What is claimed is:

1. An engine starter device for selectively starting an engine having a starting gear, said engine starter device comprising:

a power shaft;

a sleeve slidably, but non-rotatably, secured to said power shaft, said sleeve having external helical splines formed on one extremity thereof;

a pinion gear slidably journalled to said power shaft for axial movement thereto, said pinion gear being adapted for movement into and out of engagement with said starting gear of said engine to be started;

a driven clutch member secured to said pinion gear for movement therewith;

an annular recess formed in said driven clutch member;

a driving clutch member slidably mounted on said helical splines of said sleeve, said driving and driven clutch members having complementary mutually engageable inclined teeth for transmitting torque therebetween in one direction of rotation;

a barrel housing having an open end, said barrel housing being slidably supported on said sleeve and spatially encompassing said driving and driven clutch members;

abutment means disposed within said barrel housing adjacent said open end thereof, said abutment means being adapted for engagement with said driven clutch member for confining said driving and driven clutch members within said barrel housing;

resilient means disposed within said barrel housing, said resilient means abutting said driving clutch member, said resilient means further biasing said driving and driven clutch members into mutual engagement;

a radially outwardly extending shoulder formed on said driving clutch member adjacent said annular recess of said driven clutch member;

annular thrust washer means partially disposed in said annular recess, said annular thrust washer means having an inner conical surface, said annular thrust washer means further being adapted to abut said radially outwardly extending shoulder of said driving clutch member when said annular thrust washer means is displaced in an axial direction;

a flyweight guide disposed between said power shaft and said driven clutch member, said flyweight guide having a cylindrical section affixed to said driven clutch member, a plurality of finger support members attached to one end of said cylindrical section, said plurality of finger support members being positioned within said annular recess in said driven clutch member;

a plurality of centrifugal flyweight members annularly arranged within said annular recess in said driven clutch member, said plurality of centrifugal flyweight members being spaced in intercalated relationship with said plurality of finger support members, each of said plurality of flyweight members having a base portion and a wedge portion extending from said base portion, said wedge portion further having an inclined surface abutting said conical surface of said annular thrust washer means, said plurality of centrifugal flyweight members being operative to displace said annular thrust washer means in an axial direction in response to centrifugal force; and a plurality of finger elements attached to said finger support members, said plurality of finger elements arranged so as to restrict undue circumferential movement of said plurality of flyweight members without inhibiting said plurality of flyweight members as they move in a radial direction.

2. The engine starter device of claim 1 wherein said resilient means and said annular thrust washer means apply opposed forces to said driving clutch member.

3. The engine starter device of claim 1 comprising stop means movable with said pinion gear and said driven clutch member to provide an axis abutment stop for said plurality of centrifugal flyweight members.

4. The engine starter device of claim 1 wherein said plurality of centrifugal flyweight members are spaced equidistant around the arcuate extent of said annular recess.

5. The engine starter device of claim 1 wherein said plurality of finger support members are spaced equidistant around the arcuate extent of said annular recess.

6. The engine starter device of claim 1 wherein said finger support members each have a plurality of finger elements attached thereto.

7. The engine starter device of claim 1 wherein a finger element attached to a first finger support member is in generally parallel alignment with an adjacent finger element attached to a second finger support member.

8. The engine starter device of claim 7 wherein each finger support member has attached thereto as an integral part thereof two finger elements.

9. The engine starter device of claim 1 wherein said cylindrical section of said flyweight guide is in at least one piece.

10. The engine starter device of claim 1 wherein each of said plurality of centrifugal flyweight members is a unitary member that is formed without cavities therein.

11. An engine starter device for selectively starting an engine having a starting gear, said engine starter device comprising:

a power shaft;

a sleeve slidably, but non-rotatably, secured to said power shaft, said sleeve having external helical splines formed on one extremity thereof;

a pinion gear slidably journalled to said power shaft for axial movement thereto, said pinion gear being adapted for movement into and out of engagement with said starting gear of said engine to be started a driven clutch member secured to said pinion gear for movement therewith;

an annular recess formed in said driven clutch member;

a driving clutch member slidably mounted on said helical splines of said sleeve, said driving and driven clutch members having complementary mutually engageable inclined teeth for transmitting torque therebetween in one direction of rotation;

a barrel housing having an open end, said barrel housing being slidably supported on said sleeve and spatially encompassing said driving and driven clutch members;

abutment means disposed within said barrel housing adjacent said open end thereof, said abutment means being adapted for engagement with said driven clutch member for confining said driving and driven clutch members within said barrel housing;

resilient means disposed within said barrel housing said resilient means abutting said driving clutch member, said resilient means further biasing said driving and driven clutch members into mutual engagement;

a radially outwardly extending shoulder formed on said driving clutch member adjacent said annular recess of said driven clutch member;

thrust washer means disposed in said recess, said thrust washer means having an inner conical surface, said thrust washer means further being adapted to abut said radially outwardly extending shoulder of said driving clutch member when said thrust washer means is displaced in an axial direction;

a plurality of indentations circumferentially spaced from one another and positioned in the wall portion that forms said annular recess within said driven clutch member, said indentations being in predetermined radial alignment;

a plurality of centrifugal flyweight members annularly arranged within said annular recess in said driven clutch member, each of said plurality of flyweight members being spaced in intercalated relationship with a respective one of each of said plurality of indentations, each of said plurality of flyweight members having a base portion and a wedge portion extending from said base portion, said wedge portion further having an inclined surface abutting said inner conical surface of said thrust washer means, said plurality of centrifugal flyweight members being operative to displace said thrust washer means in an axial direction in response to centrifugal force; and a plurality of flyweight stabilizing surfaces on said indentations, said plurality of flyweight stabilizing surfaces arranged so as to restrict undue circumferential movement of said plurality of flyweight members without inhibiting said plurality of flyweight members as they move in a radial direction.

12. The engine starter device of claim 11 wherein said resilient means and said thrust washer means apply opposed forces to said driving clutch member.

13. The engine starter device of claim 11 further comprising stop means movable with said pinion gear and said driven clutch member to provide an axial abutment stop for said plurality of centrifugal flyweight members.

14. The engine starter device of claim 11 wherein said plurality of centrifugal flyweight members are spaced equidistant around the arcuate extent of said annular recess.

15. The engine starter device of claim 11 wherein said plurality of indentations are spaced equidistant around the arcuate extent of said annular recess.

16. The engine starter device of claim 11 wherein a stabilizing surface of one indentation is in parallel alignment with the stabilizing surface of an adjacent indentation.

17. The engine starter device of claim 11 wherein each of said plurality of centrifugal flyweight members is a unitary member that is formed without cavities therein.

18. The engine starter device of claim 11 wherein the spaces between the indentations define partial annular recesses in said driven clutch member, said partial annular recesses each extending from said annular recess of said driven clutch member, each of said partial annular recesses slidably receiving a single flyweight member.

19. A method for manufacturing a driven clutch member for an engine starter device comprising the steps of:

(a) forming a cylindrically shaped aperture in one end of said driven clutch member;

(b) inserting a back-up die within said aperture, said back-up die having a plurality of axially extending grooves therein and;

(c) introducing an indentation producing tool exteriorly of said aperture and moving said indentation producing tool in a radial direction so that a wall of said driven clutch member adjacent said aperture conforms to at least a portion of the exterior surface of said back-up die, thereby forming a plurality of indentations in said wall of said driven clutch member.

20. The method for manufacturing a driven clutch member as set forth in claim 19 wherein each indentation of said plurality of indentations is formed at equally spaced apart circumferential locations around said wall of said driven clutch member.

* * * * *

UNITED STATES PATENT AND TRADEMARK OFFICE
CERTIFICATE OF CORRECTION

PATENT NO.  : 4,768,392
DATED       : September 6, 1988
INVENTOR(S) : Paul F. Giometti It is certified that error appears in the above-identified patent and that said Letters Patent is hereby corrected as shown below:

In the Claims

Column 8, line 38, after "started" insert a semi-colon ---- ; ----.

Column 8, line 52, after "housing" insert a comma ---- , ----.

Column 10, line 27, delete "therein and;" and insert ---- therein; and ----.

Signed and Sealed this

Twenty-first Day of February, 1989

Attest:

DONALD J. QUIGG

*Attesting Officer*  *Commissioner of Patents and Trademarks*